United States Patent
Ovando

[15] 3,654,419
[45] Apr. 4, 1972

[54] TRACK WELDING APPARATUS
[72] Inventor: Hugo H. Ovando, Napa, Calif.
[73] Assignee: Kaiser Steel Corporation, Oakland, Calif.
[22] Filed: Mar. 10, 1971
[21] Appl. No.: 122,789

[52] U.S. Cl. ..........................................219/60 R, 219/125 R
[51] Int. Cl. ............................................................B23k 9/12
[58] Field of Search ..................219/60 R, 60 A, 125 R, 137, 219/161, 65, 127

[56] References Cited

UNITED STATES PATENTS 3,495,064  2/1970  Grimoldi et al. .....................219/60 R
3,114,289  12/1963  Libby....................................219/124
2,550,641  4/1951  Harter..............................219/60 R X Primary Examiner—J. V. Truhe
Assistant Examiner—L. A. Schutzman
Attorney—James E. Toomey, Paul E. Calrow, Harold L. Jenkins and Elmer E. Goshorn

[57] ABSTRACT

Improved adjustable fixture for pipe tack welding apparatus whereby the apparatus can tack weld a pipe section that has a length greater than the length of the apparatus itself by simple adjustment of a fixture together with a sensing device for controlling adjustment of the fixture.

12 Claims, 7 Drawing Figures

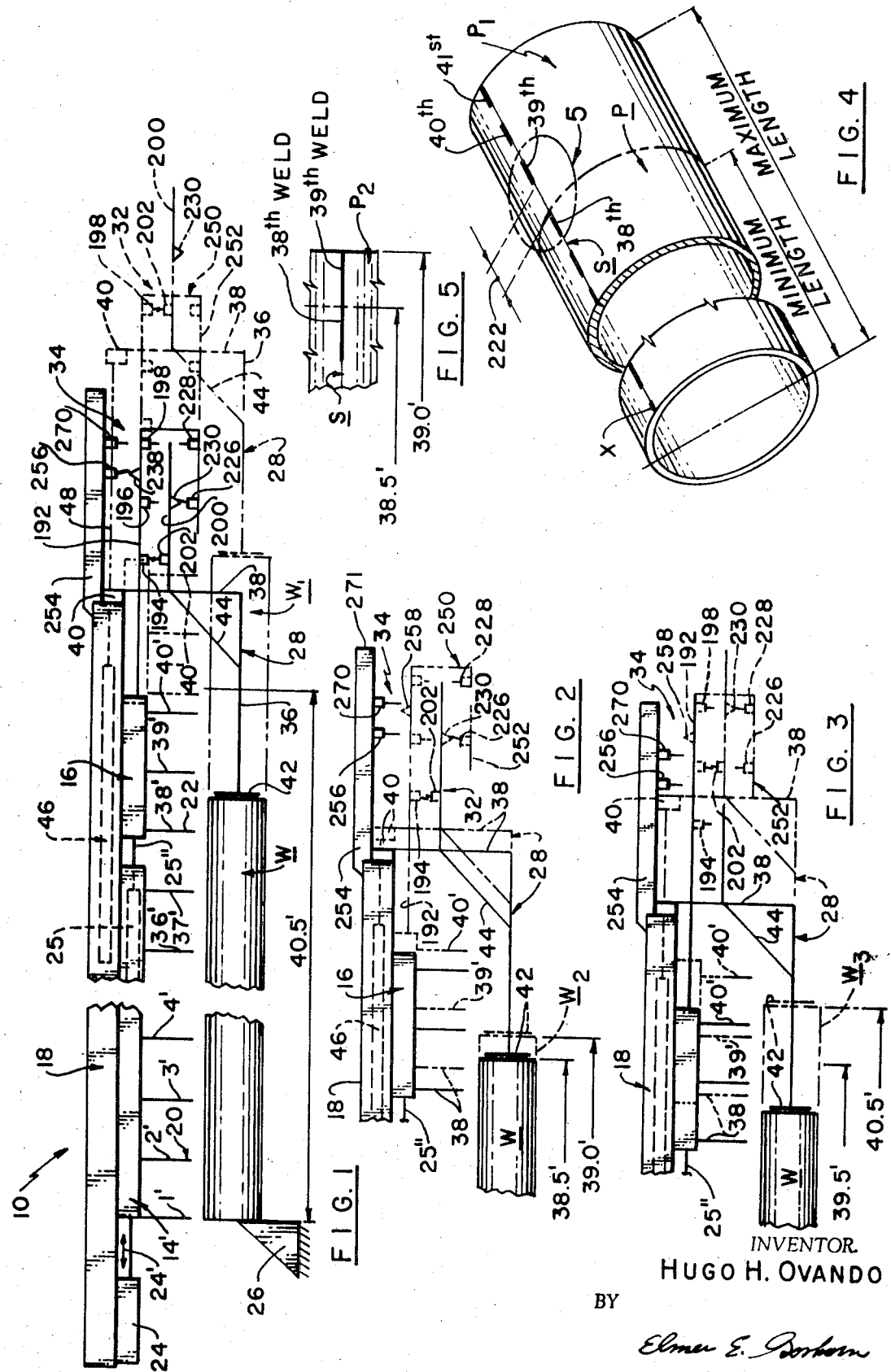

3,654,419

TRACK WELDING APPARATUS

BACKGROUND OF THE INVENTION

This invention relates to a tack welding apparatus. More particularly it relates to an improved adjustable fixture for a tack welding apparatus of the type shown in U.S. Pat. No. 3,495,064 to Grimoldi et al. granted Feb. 10, 1970, and for forming a plurality of substantially uniformly spaced tack welds along the seam length of a pipe that is longer than the usual tack welder apparatus together with a control device for such fixture.

Prior pipe seam tack welding apparatus as exemplified in the aforesaid patent to Grimoldi et al. normally were equipped with a plurality of spaced tack welding elements selectively spaced relative to each other along the seam of a pipe being welded. In order to keep the size of such tack welder apparatus within practical size limits and in lieu of having the tack welder apparatus be of a tremendous size while still being capable of handling and tack welding relatively long sections of pipe of different lengths the improved instant tack welder fixture has been developed. The present apparatus is an improvement over the welding apparatus of the aforementioned patent as well as over the welding apparatus of U.S. Pat. No. 3,210,519 to Kerchoff granted Oct. 5, 1965 and U.S. Pat. No. 3,508,107 to Jones granted Apr. 21, 1970.

The tack welding apparatus of the present invention is advantageously comprised of improved first and second interconnected carts wherein the first and second carts have an overall plurality of spaced tack welding elements and wherein the second cart is extendable relative to the first cart from a retracted position to an extended position. A unique and advanceable sensing arrangement is advantageously mounted on a framework independently of the second cart for sensing the trailing end of a pipe to be tack welded in the apparatus. The sensing arrangement is operatively associated with the second cart whereby the second cart can be advanced from a retracted position to an extended position relative to the sensing arrangement when it senses a pipe of certain length. Thus by reason of the unique and improved co-operation between the sensing arrangement and the second cart, the apparatus can effect formation of a plurality of tack welds along the seam length of a pipe even though the pipe length is much greater than the combined length of first and second carts when the second cart is in a fully retracted position.

SUMMARY OF THE INVENTION

The primary purpose of the instant invention is to provide an improved apparatus for forming a plurality of substantially uniformly spaced tack welds along the seam of a pipe section regardless of whether the pipe section is of minimum length or substantially greater than minimum length by means of an improved and adjustable welding fixture together with an improved control arrangement for the fixture.

The apparatus generally comprises first and second interconnected carts wherein the second cart is extendable from a retracted position to an outward extended position with respect to the first cart. Each cart has a combined or overall plurality of spaced tack welding elements for forming a plurality of spaced tack welds along the seam length of a workpiece upon welding stroke movement of the first and second carts together with respect to the seam length of the workpiece during operation of the apparatus. The opposed and endmost tack welding elements of the combined plurality of tack welding elements of the first and second carts of the apparatus when the second cart is in its retracted position with respect to the first cart are preferably spaced apart by a distance that equals the minimum length of a workpiece or pipe section being tack welded.

The apparatus includes a sensing device for engaging a pipe so as to sense the length of the pipe and then actuate a control system such as an electric hydraulic control system for effecting one or more welding strokes of the first and second carts in sequential and automatic fashion depending on the desired welding operation. Depending upon the plurality of tack welding elements required for the first and second carts of a given apparatus and depending upon electrical requirements for the plurality of tack welding elements of the first and second carts of the given apparatus as well as the length of a workpiece the control system can be advantageously programmed for selectively energizing only certain tack welding elements of the first and second carts of the overall plurality of tack welding elements during a given welding stroke thereof. Thus by virtue of only certain tack welding elements of the plurality of tack welding elements of the instant apparatus being energized during a given stroke thereof the plurality of spaced tack welds are formed in progressive but substantially uniformly spaced fashion between the ends of a given workpiece of certain length.

The control system can include means for de-energizing one or more tack welding elements of the plurality of tack welding elements of the second cart if these one or more tack welding elements are disposed beyond the end of a given pipe of certain length when the second cart is in a fully retracted or extended position relative to the first cart upon a welding stroke of the apparatus during operation thereof.

The control system may also be comprised of other means for automatically returning the second cart from an extended position to a fully retracted position after progressively forming a plurality of spaced tack welds along the seam length of a given pipe. If desired the control system may also include still other means for automatically preventing the formation of a tack weld of double thickness in the plurality of tack welds along the seam of a given pipe of certain length as well as for preventing the formation of an overlapped or double-thick weldment between the immediately adjacent tack welds of the plurality of tack welds when a pipe is of another length.

The apparatus is particularly useful as an improvement over the aforesaid Grimoldi et al. patent in forming a plurality of spaced tack welds along the seam length of a pipe but it is not intended to be limited to such.

BRIEF DESCRIPTION OF THE DRAWINGS

FIG. 1 is a schematic elevational view of a preferred embodiment of a tack welding apparatus of the instant invention and illustrates in dotted and solid lines more than one operative position of the apparatus thereof;

FIGS. 2–3 are fragmentary and schematic elevational views similar to FIG. 1 and illustrate other operative positions of the present apparatus;

FIG. 4 is an enlarged and fragmented perspective view of a pipe workpiece after the present apparatus forms a plurality of spaced tack welds along the seam thereof;

FIG. 5 is an enlarged plan view taken within the bounds of line 5 of FIG. 4 and illustrates the formation of certain tack welds when a pipe workpiece is of another length.

DETAILED DESCRIPTION

Figure 6A:
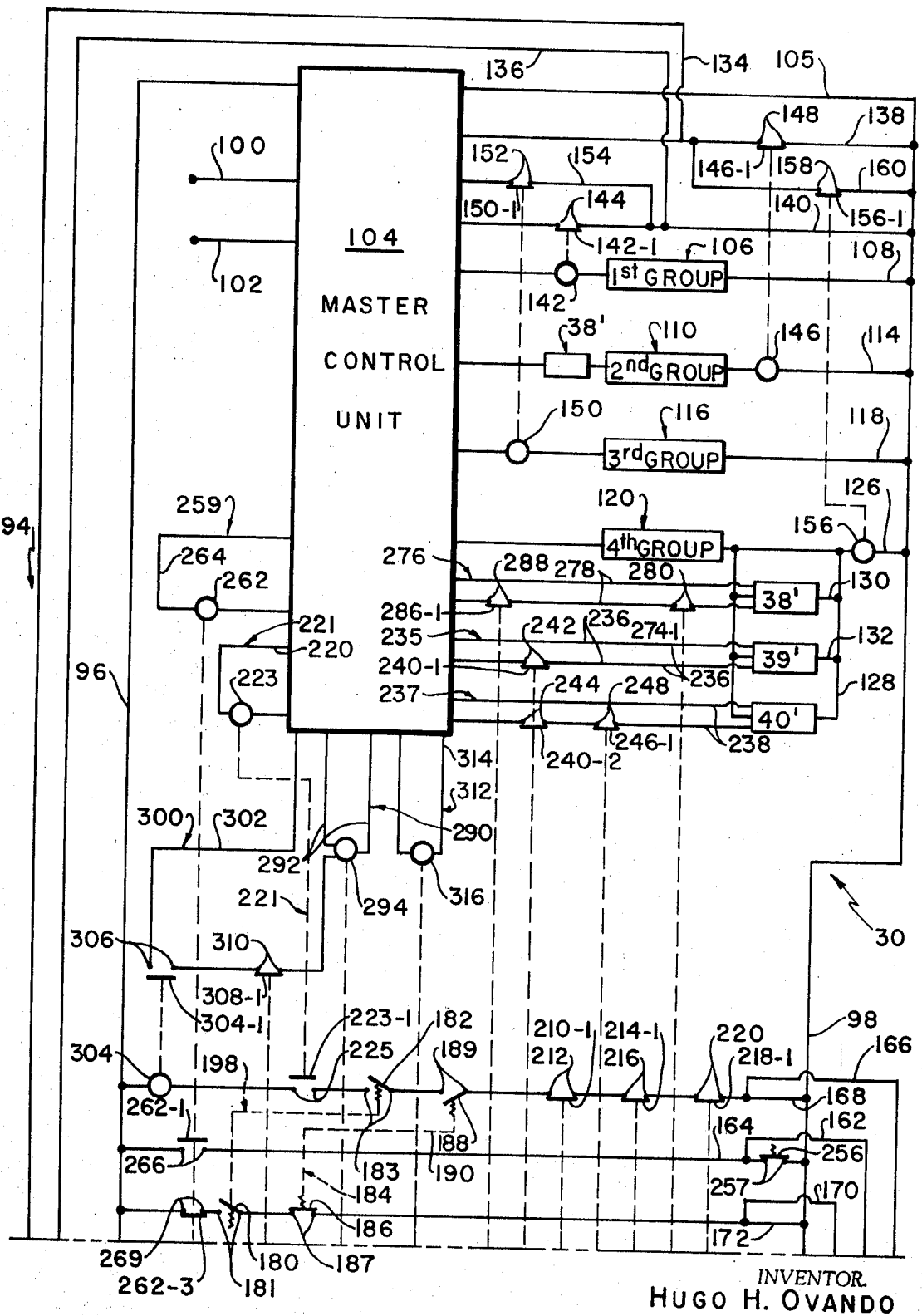
FIGS. 6A and 6B when taken together and placed end to end is a schematic and diagrammatic view of an electric hydraulic control system that can be used with the present apparatus.

With further reference to the drawings, FIGS. 1–5 illustrate a preferred embodiment of an apparatus for progressively forming a plurality of longitudinally spaced tack welds $X$ along the seam $S$ of a pipe workpiece of a given length, for example, a minimum length workpiece $W$ so as to form a tack welded pipe $P$. The apparatus generally comprises a first tack welding cart 14 and a second tack welding cart 16 interconnected to the first cart. An overhead framework 18 supports the first and second interconnected carts in tandem fashion. As will become more apparent hereinafter first cart 14 is preferably made up of a plurality of 37 uniformly spaced tack welding elements 20 (not fully shown for the purpose of brevity in FIG. 1, but with certain tack welding elements 20 of the plurality of 37, such elements numbered 1' through 4' and 36' through 37', as depicted from left to right in FIG. 1). Second cart 16 is made up of a plurality of three tack welding elements 22, numbered 38' through 40' from left to right in FIG. 1. An actuator 24 is affixed to the left end of framework 18 and the outer end of rod 24' of the piston rod subassembly of actuator 24 is connected to the left end of first cart 14 for effecting tack welding stroke advancement of the first and second carts together in opposite longitudinal directions relative to the seam length of a workpiece between its ends upon advancement of actuator rod 24' during operation of the apparatus. An actuator 25 is preferably mounted in first cart 14 at the right end thereof. The outer end of the rod 25'' of the piston rod subassembly of the actuator 25 is connected to the left end of second cart 16. Thus second cart 16 can be adjusted from a fully retracted position relative to first cart to an extended position and vice versa upon movement of actuator rod 25'', as indicated in FIGS. 1–3.

The apparatus includes a removable stop 26 for engaging the leading end of a workpiece and for positioning the leading end of the workpiece in planar alignment with the first tack welding element 1' of the plurality of tack welding elements 20 of the first cart 16 when a workpiece is disposed in the apparatus. A workpiece is fed into the apparatus preferably from right to left in FIG. 1 in an appropriate fashion such as by a conveyor (not shown) until the left leading end of the workpiece $\underline{W}$ abuts stop 26. It is understood, of course, when a workpiece such as $\underline{W}$ is disposed in apparatus 10 that the opposed seam edges of the workpiece are held in clamping engagement in suitable fashion throughout the length of the seam $\underline{S}$ of the workpiece upon formation of a plurality of spaced tack welds $\underline{X}$ along the seam during operation of apparatus 10, as indicated in FIGS. 4–5. Since the particular manner in which framework 18 supports carts 14 and 16 and actuator 24 is connected to the framework, etc. do not constitute a significant part of the present invention no further discussion is believed necessary. Reference, however, is made to the apparatus of the aforesaid Grimoldi et al. patent as illustrative of an embodiment of tack welding carts, framework, stops, etc. that could be used in the present invention.

The apparatus of the instant invention advantageously includes an extendable workpiece sensing device or sensor 28 connected to framework 18. The sensing device is adapted to abut the trailing or right-hand end of a workpiece $\underline{W}$ in FIG. 1 for sensing the length of the workpiece when its leading end engages stop 26. The apparatus is advantageously provided with an electric hydraulic control system 30 as indicated in FIGS. 1–3 and 6A–6B. The control system can be programmed for moving rod 24' of actuator 24 to effect one or more sequential welding stroke advancements of carts 14 and 16 in unison with respect to the seam length of a workpiece between its ends during operation of the apparatus.

The control system is advantageously comprised of a set of cooperative limit switch and stop devices 32 cooperatively associated with and selectively mounted on sensor 28 and cart 16 for determining whether a pipe is equal to a given minimum length or is greater than the minimum length. If the pipe is greater than the minimum length devices 32 and sensor 28 cooperate to advance the rod 25' of actuator 25 so as to correspondingly advance cart 16 from a retracted position to an outward extended position in alignment with the trailing end of a workpiece of greater than minimum length during a certain part of the operative cycle of the apparatus. The devices 32 also include means if desired for selectively de-energizing the 39' and 40' tack welding elements of cart 16 when a workpiece $\underline{W}$ has a length between minimum and maximum lengths thereof.

The control system can include another set of co-operative limit switch and stop devices 34 operatively associated with framework 18 and cart 16 for automatically returning the cart from an extended position to a fully retracted position prior to another operative cycle of the apparatus. Devices 34 can include means for automatically de-energizing 38' tack welding element of cart 16 when a pipe is of minimum length upon a certain welding stroke advancement of carts 14 and 16 so as to prevent formation of a 38th weld of double thickness. Device 34 also includes further means for automatically turning off an energized 38' welding element during a welding stroke advancement thereof so as to prevent the formation of an overlapped weldment between adjacent 38th and 39th welds of a workpiece when the workpiece is somewhat greater than minimum length.

A cylindrically shaped workpiece such as $\underline{W}$ as handled by the apparatus of the instant invention is usually formed from a flat roll formed steel plate of suitable grade and of appropriate length and width and the plate is normally gradually formed into a seamed and open ended workpiece of circular shape by a series of press and die operations in appropriate manner.

Apparatus 10 preferably handles a seamed workpiece having a length in the range of about 38½ feet minimum length to 42½ feet maximum length as indicated at $\underline{W}$ and $\underline{W}_1$ in FIG. 1. Other seam workpieces that can be handled by the apparatus and of lengths between the approximately maximum and minimum lengths thereof are indicated at $\underline{W}_2$ and $\underline{W}_3$ in FIGS. 2–3 respectively. Since the workpiece is preferably 38½ to 42½ feet long, the various adjacent tack welding elements of the overall plurality of 40 tack welding elements 20 and 22 of carts 14 and 16, when cart 16 is in a retracted position, are spaced 1 foot apart on their centers thereby placing the 40' tack welding element of cart 16 off set about 6 inches inwardly of the trailing end of a workpiece $\underline{W}$ of minimum length (38.5 feet) prior to the first welding stroke of an operative cycle of apparatus 10 during operation thereof as indicated in FIGS. 1–2. In view of the 6 inch off-set of the 40' tack welding element carts 14 and 16 are given about a 6 inch welding stroke advancement between the ends of the seam $\underline{S}$ of a workpiece of minimum length upon advancement of actuator 24 so as to effect progressive formation of a plurality of substantially uniformly spaced tack weldments $\underline{X}$ of about 6 inches in length as indicated in FIGS. 4–5. Even if the workpiece is greater than minimum length apparatus 10 will progressively form a plurality of substantially uniformly spaced tack welds $\underline{X}$ along the open seam length thereof as will now be described.

In an advantageous embodiment of apparatus 10 workpiece sensing device 28 is advantageously connected to framework 18. A device 28 is comprised of intersecting L-shaped leg sections 36 and 38 and a block element 40 connected to the upper end of leg section 38. A plate 42 for sensing and abutting the trailing end of a workpiece is affixed in suitable fashion to the outer or left-hand end of leg section 36 of the sensing device. Plate 42 has a length so as to assure abutting engagement with the trailing end of a workpiece $\underline{W}$ during operation of the apparatus. If desired a reinforcing and stiffening strut 44 can extend between and be interconnected to leg sections 36 and 38 adjacent their point of intersection.

The device is further comprised of a fluid actuator 46 mounted in framework 18 at the right-hand end thereof. The outer end of rod 48 of the piston rod subassembly of actuator 46 of device 28 projects through the right-hand end of framework 18 and is suitably connected to the block 40 thereof. As best indicated in FIG. 1 the rod 48 of actuator 46 has a length somewhat greater than the difference in length between the maximum and minimum lengths of workpieces to be handled by the apparatus during operation thereof. Leg section 38 has a length between its ends so that the intersection leg section 36 connected to the lower end of leg section 38 is disposed in substantial coaxial alignment with a workpiece $\underline{W}$ disposed in apparatus 10. Leg section 36, however, has a length substantially corresponding to the length of rod 48 of actuator 46. Thus when rod 48 of actuator 46 is moved fully to the right in FIG. 1 workpiece engaging plate 42 of sensor 28 is correspondingly moved rightwardly and disposed outwardly of the right-hand trailing end of a workpiece $\underline{W}_1$ of maximum length. On the other hand when rod 48 of actuator 46 is moved fully to the left in FIGS. 1–3 plate 42 is correspondingly moved to the left and is disposed in abutting engagement against the trailing end of a workpiece whether the workpiece is of maximum or minimum length or of a length between the maximum and minimum lengths, as indicated in FIGS. 1–3.

Leg sections 36 and 38, plate 42 and stiffener 44 all of device 28 are made up of appropriate bar and plate stock, etc. in order that the device has adequate rigidity such as when plate 42 abuts the trailing end of a workpiece. Since leg sections 36 and 38, etc. of device 28 normally present an obstacle along the workpiece pass line of apparatus 10 block 40 of device 28 is comprised of a suitable cross slide assembly (not shown) extending between and interconnected to the outer end of rod 48 and the upper end of leg section 38. Upon actuation of cross slide assembly (not shown) leg sections 36 and 38 can be laterally shifted in one direction relative to actuator rod 48 until leg sections 36 and 38 are advanced to an out-of-the way lateral position relative to the workpiece pass line of apparatus 10. After a workpiece such as W has been fed into the apparatus along its workpiece pass line and abuts stop 26 cross slide assembly (not shown) of block 40 can be reactuated for laterally shifting leg sections 36 and 38 in the opposite direction until leg sections 36 and 38 are aligned with the axis of the workpiece W prior to an operative cycle of the apparatus. Since rod 48 of device 28 can extend outwardly of framework 18 at the right-hand end thereof and since leg sections 36 and 38 of the device are directly supported by rod 48 of the device at its outer end, a suitable cantilevered trackway (not shown) can be affixed to the right end of framework for slidably and supportably engaging the rod thereby maintaining plate 42 in abutting alignment with the trailing end of a workpiece during operation of apparatus 10.

In another advantageous embodiment of apparatus 10 an electric hydraulic control system 30 is provided for automatically and/or manually cycling the apparatus during a given tack welding operation thereof. As best indicated in FIG. 6B the control system is generally comprised of an electric hydraulic circuit 52 for selectively supplying fluid under pressure to either end of an actuator 24 or 25 or 46, as the case may be. The circuit 52 is comprised of a motor driven pump 54, fluid reservoir 56, a fluid supply line 58 and a fluid return line 60. Each one of a series of three solenoid operated three-way valves 62, 64 and 66 are operatively associated with their respective actuator 24, 25 and 46. Conduit lines 68 and 70 extend between and interconnect opposite ends of actuator 24 to associated ports (not shown) of valve 62. Similarly conduits 72 and 74 extend between actuator 25 and valve 64 as well as conduits 76 and 78 between actuator 46 and valve 66.

A series of three branch fluid supply lines 58A, 58B and 58C of supply line 58 are individually connected to the associated inlet port (not shown) of their respective valve 62, 64 and 66. Also a series of three branch return lines 60A, 60B and 60C of return line 60 are individually connected to their associated outlet port (not shown) of their respective valves 62, 64 and 66. A valve 62 has opposed solenoids 80 and 82; valve 64 opposed solenoids 84 and 86; and valve 66 solenoids 88 and 90.

When solenoid 80 of valve 62 is energized valve stem portion (not shown) thereof is shifted to the left placing inlet branch line 58A in direct fluid communication with conduit 70 thereby admitting fluid to the right end of actuator and advancing the rod 24' thereof to the left. At the same time upon energization of solenoid 80 of valve 62 exhaust branch line 60A is placed in direct open fluid communication with conduit 68 at the left end of actuator 24. Thus the fluid is exhausted from the left side of actuator 24 as the rod 24' of the piston rod subassembly thereof moves to the left.

Conversely, when solenoid 82 of valve 62 is energized valve stem portion (not shown) of valve 62 is moved to the right thereby placing conduit 68 in fluid communication with branch fluid supply line 58A while placing conduit 70 in communication with exhaust branch line 60A. Thus rod 24' of actuator 24 is advanced to the right.

Upon energization of solenoid 84 of valve 64 fluid branch supply line 58B is in direct communication with conduit line 74. Thus the rod 25'' of actuator 25 is moved to the left and fluid is exhausted from the left-hand end of actuator 25 through lines 72, 60B and 60 to sump 56. The rod 25'' of actuator 25 is moved to the right when solenoid 86 is energized thereby directing pressure fluid from supply line 58B to conduit 72 and exhausting pressure fluid from the right end of actuator 25 through conduit 74 to line 60B.

With reference to actuator 46, energization of solenoid 88 of valve 66 thereof fluidly interconnects pressure supply line 58C with conduit 78 and fluidly interconnects conduit 76 to exhaust line 60C thereby advancing the rod 48 of actuator 46 to the left. Energization of solenoid 90 of valve 76 of actuator 46, however, connects line 76 with fluid pressure line 58C and conduit 78 with exhaust conduit 60C thereby advancing the rod of actuator 46 to the right. Thus selective energization and de-energization of the solenoids of valve 62 or 64 or 66 of actuator 24 or 25 or 26, as aforedescribed, controls the direction of movement of the associated rod 24' or 25'' or 48 of the respective actuator and the extent of the movement of the associated rod thereof.

When the solenoids of the valve 62, 64 or 66 of an actuator 24, 25 or 26 are non-energized during operation of apparatus the valve stem portion (not shown) of a valve 62, 64, 66, is disposed in a neutral or intermediate position. When a valve 62 or 64 or 66 is in a neutral position the valve stem portion (not shown) thereof has a by-pass (not shown) for fluidly intercommunicating a branch pressure line 58A or 58B or 58C with its associated exhaust branch lines 60A or 60B or 60C thereby freely circulating fluid under pressure between pump 54 and sump 56 during operation of apparatus 10. A pump relief valve 92 can be series connected to a line 94 extending between supply line 58 and exhaust line 60, if desired, as shown in FIG. 6B.

The control system is also advantageously comprised of an electric control circuit 94 operatively associated with electric hydraulic circuit 52. The circuit 94 advantageously includes a master control unit 104 for enabling programming of a plurality of four sequential tack welding stroke advancements of carts 14 and 16 in automatic or manual fashion when the length of a workpiece is minimum length or greater than minimum length during an operative cycle of the apparatus. Control unit 104 is connected through input leads 100 and 102 to suitable AC source (not shown) and can be manually turned on and/or manually turned off in a suitable manner. When the control unit is turned on it can be programmed for effecting the four welding strokes of apparatus 10 during an operative cycle thereof. It is to be understood, of course, that for the sake of brevity not all circuits are illustrated that are associated with unit 104. However, those circuits associated with unit 104 and not shown for purposes of brevity are believed to be within the skill of the circuit designer other than the circuits connected to output leads 96 and 98 of unit 104 as will now be specified below.

Upon each welding stroke of carts 14 and 16 of the four sequential welding strokes thereof during an operative cycle of apparatus 10 the master control unit functions to energize a certain group of tack welding elements of carts 14 and 16 of the overall plurality of tack welding elements thereof so as to assure proper formation of all tack welds X of the plurality of tack welds X of a given pipe in accordance with the teachings of the instant invention. It has been found that during the first welding stroke of apparatus 10, odd numbered tack welding elements 1' through 29' inclusively of the plurality of tack welding elements 20 of cart 14 are energized as diagrammatically indicated by block 106 in FIG. 6A. Each of the odd numbered 1'–29' welding elements as illustrated by block 106 in FIG. 5A is parallel connected (not shown) to lead 108 which in turn is connected between unit 104 and lead 98.

Upon the second welding stroke of apparatus 10 during an operative cycle thereof even numbered tack welding elements 2' through 30' inclusively and 38' of the overall plurality of welding elements 20 and 22 of carts 14 and 16 are energized. For reasons that will become more apparent hereinafter 38' welding element of the even numbered tack welding elements 2'-30<⅛ and 38' is separately indicated in FIG. 6A. The other elements 2'-30' of the even numbered tack welding elements are diagrammatically indicated by block 110 in FIG. 6A. Lead 114 is parallel connected (not shown) to 38' tack welding element and to 2'-36' tack welding element as shown by block 110. Also lead 114 extends between lead 98 and unit 104.

When the third welding stroke of carts 14 and 16 occurs during an operative cycle of apparatus 10 odd numbered welding elements 31'-37' of cart 14 of the plurality of welding elements thereof are energized and are diagrammatically indicated by block 116. Branch lead 118 is parallel connected (not shown) to the plurality of welding elements 31'-37' as diagrammatically depicted by block 116 in FIG. 6A and is connected between unit 104 and lead 98.

Upon the fourth welding stroke of carts 14 and 16 of apparatus 10 during an operative cycle thereof even numbered welding elements 32'-36' of cart 16 of the plurality of welding elements thereof are all energized relative to a workpiece length. Welding elements 32'-36' of the fourth group are diagrammatically indicated by block 120 and are parallel connected (not shown) to a branch lead 126 that is connected between unit 104 and lead 98. At the same time during the fourth welding stroke of carts 14 and 16 of apparatus 10, 38', 39' and 40' tack welding elements of second cart 16 are automatically energized and/or nonenergized depending upon the length of a workpiece such as e.g. minimum length or greater than minimum length, as will be more fully set forth below. 40' welding element is parallel connected (not shown) to branch lead 128 which is connected across branch lead 126. 38' and 39' welding elements are parallel connected (not shown) to their associated branch leads 130 and 132. Each one of the branch leads 130 and 132 is parallel connected across branch lead 128.

Leads 134 and 136 extend between and are connected to the solenoids 80 and 82 of circuit 52 of system 30 and branch leads 138 and 140 of circuit 94 thereof thereby electrically connected solenoids 80 and 82 to leads 134 and 136 respectively. Leads 138 and 140 are connected across unit 104 of circuit 94 and lead 98 thereof. A solenoid 142 is series connected to lead 108 and includes a normally open solenoid contact 142-1 for bridging spaced contacts 144 of lead 140. Thus when lead 108 and the first group 106 of odd numbered tack welding elements 1'-37' of cart 14 are energized by unit 104 during the first welding stroke of apparatus 10, solenoid 142 is also energized thereby advancing its normally open contact across bridge contacts 144. Such bridgement of contacts 144 energizes lead 140 thereby energizing lead 136 which in turn energizes solenoid 82 for advancing rod 24' of actuator 24 to the right. Rightward advancement of the rod 24' of actuator 24 causes corresponding rightward and first welding stroke advancement of carts 14 and 16 during operation of apparatus 10.

A solenoid 146 is series connected to branch lead 114 associated with the second group 110 of even numbered elements 2'-38' of carts 14 and 16. Solenoid 146 has a normally open contact 146-1 disposed in operative relationship with spaced bridging contacts 148 of lead 138. Upon unit 104 energizing lead 114, 38' welding element and the second group 110 of welding elements, solenoid 146 is also energized thereby advancing its contacts to bridge contacts 148 on lead 138. The solenoid contact 146-1 in bridging contacts 148 causes energization of lead 138 which in turn energizes lead 134 and solenoid 80 of valve 62 of actuator 24. Energization of solenoid 80 causes leftward advancement of the rod 24' of actuator 24 thereby causing corresponding leftward and second welding stroke advancement of carts 14 and 16 during operation of apparatus 10.

A solenoid 150 is series connected to lead 118 which is connected across the third group 116 of odd numbered welding elements 31'-37'. The normally open contact 150-1 of solenoid 150 is operatively associated with spaced bridging contacts 152 of lead 154. The lead extends between unit 104 and an intermediate point of lead 140 disposed between adjacent spaced contacts 144 of lead 140 and lead 98. When lead 118 is energized by control 104, solenoid 150 and the third group 116 of welding elements 31'-37' are also energized. Energization of solenoid 150 advances its normally open contact 150-1 into bridging engagement across spaced contacts 152 of lead 154 thereby energizing leads 154, 140, 136 and solenoid 82. Energization of solenoid 82 causes rightward and third stroke advancement of the rod 24' of actuator 24 and corresponding rightward stroke movement of carts 14 and 16 during a given operative cycle of the apparatus.

A solenoid 156 is series connected to lead 126 which is parallel connected (not shown) to the fourth group 120 of even numbered tack welding elements 32'-36'. The normally open contacts 156-1 of solenoid 156 are disposed in operative relationship to bridging contacts 158 of lead 160. Lead 160 extends between and is connected to lead 98 and to an intermediate point of lead 138 disposed between unit 104 and bridgeable contacts 148 of lead 138. As lead 126 and the fourth group 120 of welding elements are energized by unit 104 solenoid 156 is also energized thereby advancing its normally open contact 156-1 into bridging engagement across spaced contacts 158 of lead 160. Bridging of contacts 158 by the normally open contact of solenoid 156 energizes leads 160, 138 and 134 and solenoid 80 of valve 62 of actuator 24. Energization of solenoid 80 causes corresponding leftward and fourth welding stroke movement of rod 14' of the actuator and carts 14 and 16 when an operative cycle of apparatus 10 occurs.

It is understood of course that adjustable limit switch and stop devices (not shown) are provided and operatively associated with the rod 24' of actuator and leads 138 and 140 of unit 104 for precisely limiting the extent of leftward and rightward welding stroke movement of the rod of the actuator such as about 6 inches welding stroke movement, as aforementioned.

Figure 6B:
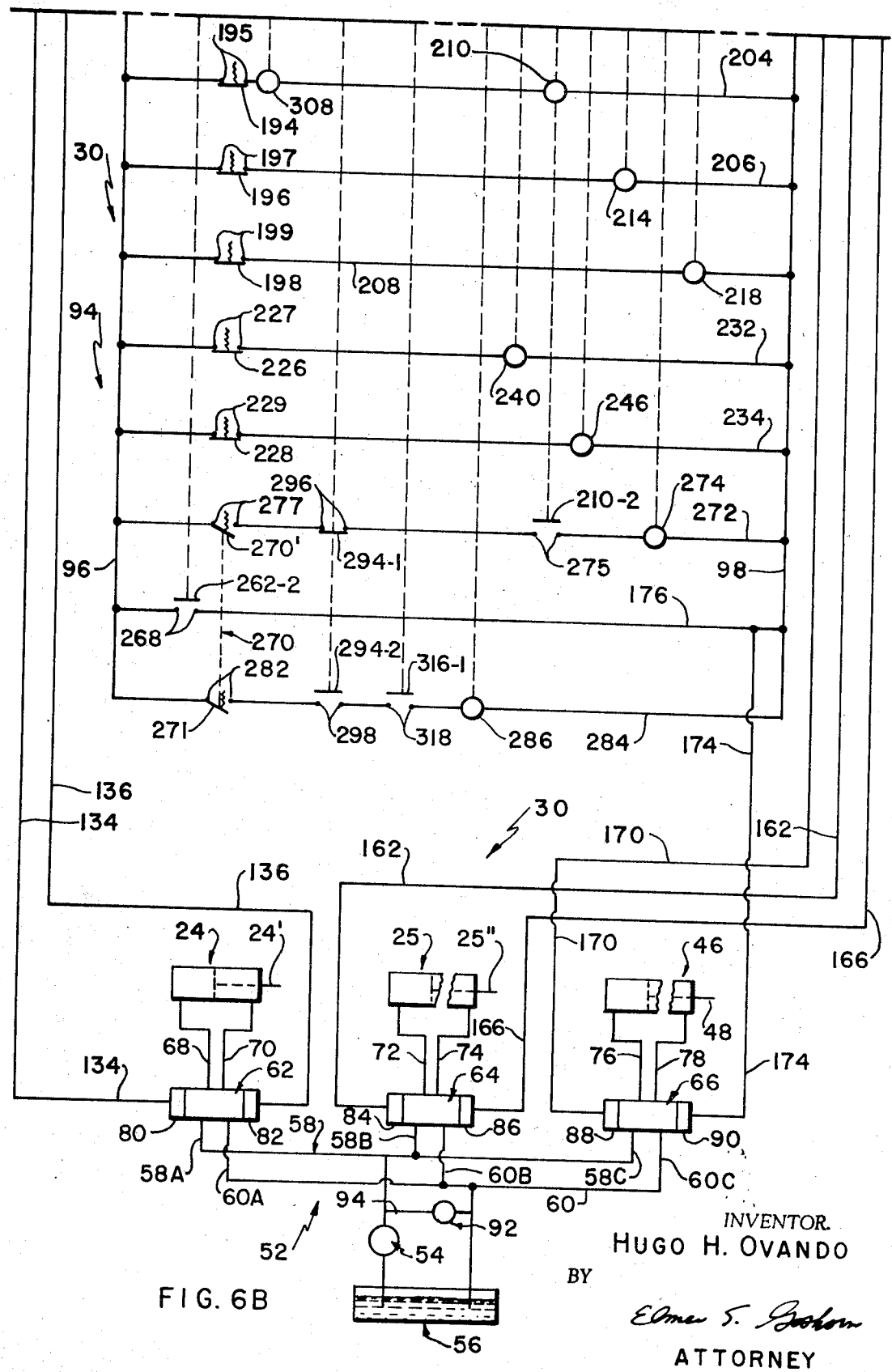

In order to effect automatic advancement of second cart 16 from a fully retracted position to an extended position with respect to first cart 14 and vice versa, solenoids 84 and 86 of valve 64 of actuator 25 of circuit 52 of system 30 are electrically connected to circuit 94 of the system as indicated in FIGS. 6A-6B. A lead 162 of circuit 52 parallel connects solenoid 84 of valve 64 of actuator 25 of the circuit to lead 164 of circuit 94 which is series connected across leads 96 and 98 thereof. Also a lead 166 of circuit 52 connects solenoid 86 of the circuit to lead 168 of circuit 94 which is series connected across leads 96 and 98 thereof. When leads 162 and 164 are energized, solenoid 84 is energized thereby causing leftward stroke movement of rod 25" of actuator 25. Similarly as leads 166 and 168 are energized solenoid 86 is energized thereby causing rightward stroke movement of rod 25".

In order to effect automatic advancement of sensing device 28 relative to cart 16 and framework 18 it is electrically connected between circuits 52 and 94 of system 30. A lead 170 of circuit 52 is parallel connected across solenoid 88 of circuit 50 of the circuit and lead 172 which is series connected between leads 96 and 98 of circuit 94. Also a lead 174 of circuit 52 is parallel connected between solenoid 90 of the circuit and lead 176 which is series connected between leads 96 and 98 of circuit 94. Thus when leads 170 and 172 or leads 174 and 176 are energized solenoid 88 or 90 is energized thereby respectively causing leftward or rightward movement of the rod 48 of actuator 46 of sensor 28 during operation of apparatus 10.

Circuit 94 of system 30 includes a workpiece engaged limit switch 178 suitably mounted on stop 26. The limit switch has a pair of mechanically interconnected and normally open contacts 180 and 182. Normally open limit switch contact 180 of limit switch 178 is connectable across spaced terminals 181 of lead 168 as indicated in FIG. 6A. On the other hand normally open limit switch contact 182 of limit switch 178 is connectable across spaced contacts 183 of lead 168.

Circuit 94 of system 30 also includes a workpiece engaging limit switch 184 advantageously mounted on plate 42 of sensor 28 in suitable fashion. The limit switch has a normally closed contact 186 and a normally open contact 188. A link 190 mechanically interconnects normally closed contact 186 of switch 184 to normally open contact 188 thereof. Normally closed contact 186 of switch 184 is connected across spaced contacts 187 of lead 172 and normally open contact 188 is connectable across bridgeable terminals 189 of lead 168.

Assuming that a workpiece W is disposed in apparatus 10 the leading end of the workpiece closes both normally open contacts 180 and 182 of workpiece limit switch 178 suitably mounted on stop 26. Closure of normally open contact 180 of switch 178 energizes leads 172 and 170 and solenoid 88 thereby causing leftward advancement of the rod 48 of actuator 46 of sensor 28 and corresponding leftward advancement of plate 42 of the sensor until it engages the trailing end of a given workpiece in apparatus 10. When plate 42 engages the trailing end of the given workpiece normally closed and normally open contacts 186 and 188 of switch 184 are respectively opened and closed. Opening of normally closed contact 186 of switch 184 causes de-energization of leads 172 and 170 and solenoid 88 thereby terminating leftward stroke movement of the rod 48 of actuator 46 of sensing device 28 and plate 42 thereof. On the other hand since normally open contact 182 of limit switch 178 has been previously closed by the leading end of a given workpiece as aforedescribed closure of normally open contact 188 of limit switch 184 will energize leads 168 and 166 and solenoid 86 of valve 64 of actuator 25 thereby causing rightward stroke movement of second cart 16 from a retracted position to an outwardly extended position when a workpiece is greater than minimum length as will now be described.

Control system 30 advantageously includes a cooperative limit switch and stop devices 32 for effecting controlled rightward movement of second cart 16 from a fully retracted position to an outwardly extended position whenever a workpiece is greater than minimum length after the workpiece is engaged by sensing device 28. As indicated in FIGS. 1–3 devices 32 include a bar or arm 192 affixed to the right-hand end of second cart 16 and extending outwardly thereof. Arm 192 has a length substantially corresponding to the length of rod 48 of sensor 28. The co-operative limit switch and stop devices 32 are comprised of a series of three normally closed limit switches 194, 196 and 198 operatively associated with welding elements 38', 39' and 40', respectively. The cooperative limit switch devices 32 include a bar or rod 200 affixed to an intermediate point of leg section 38 of sensor 28. Bar 200 extends outwardly of the intermediate point of the leg section 38 of sensor 28 and in parallel and spaced relation to arm 192. Devices 32 are also comprised of a stop element 202 which is operatively associated with each one of the three normally closed limit switches 194, 196 and 198 of the series thereof during operation of apparatus 10. Limit switch 194 is affixed to arm 192 and stop element 202 is affixed to rod 200. In affixing limit switch 194 to arm 192 and stop element 202 to rod 200 the limit switch and stop element are disposed in axial alignment when cart 16 is in a fully retracted position and when the rod 48 of sensing device 28 is in a fully retracted condition. Limit switches 196 and 198 are affixed to arm 192 rightwardly of limit switch 194 and spaced at distances from limit switch 194 correspondingly to the center-to-center distances between 38' and 39' welding elements and between 38' and 40' welding elements, respectively.

It is to be understood, of course, that bar 192 of devices 32 is laterally off set and spaced from leg section 38 of device 28 whereby there is no interference between bar 192 and leg section 38 upon relative movement between devices 28 and 32 during operation of the apparatus. Even though bar 192 of devices 32 is laterally off set with respect to bar 200 thereof the series of three limit switches 194, 196 and 198 of devices 32 on its arm 192 can be disposed in operative relation to stop 202 of the devices on its bar 200.

As indicated in FIG. 6B normally closed limit switch 194 is series connected across terminals 195 of a lead 204 which extends between leads 96 and 98; limit switch 196 is series connected across spaced points 197 of a lead 206 between leads 96 and 98; and limit switch 198 series connected across spaced contacts 199 of a lead 208 therebetween. A solenoid 210 is series connected to lead 204 and has a normally open contact 210–1 for bridging spaced contacts 212 on lead 168 when solenoid 210 is energized as illustrated in FIGS. 6A–6B. For a reason that will become more apparent hereinafter solenoid 210 has a normally closed contact 210–2 also illustrated as open when solenoid 210 is energized as shown in FIG. 6B. Another solenoid 214 is series connected to lead 206 and has a normally open contact 214–1 for bridging spaced contacts 216 on lead 168 when solenoid 214 is energized as indicated in FIGS. 6A–6B. Also a solenoid 218 is series connected to lead 208 and is provided with a normally open contact 218–1 for bridging spaced contacts 220 on lead 168 upon energization of solenoid 218 as illustrated in FIG. 6A.

When plate 42 of sensor engages the trailing end of a minimum length workpiece as aforedescribed, stop 202 of device 32 is disposed in alignment with normally closed limit switch 194 thereof thereby opening the same. Such opening of normally closed limit switch 194 disconnects the switch from contacts 195 of lead 204 so as to de-energize lead 204 and solenoid 210 thereby opening its normally open contact 210–1 and disconnecting the same from spaced contacts 216 of lead 168. Such opening of normally open contact of solenoid 210 de-energizes leads 168 and 166 thereby preventing energization of solenoid 86 of valve 64 of actuator 25. Thus cart 16 stays in its fully retracted position for the third and fourth welding stroke passes of the apparatus during an apparatus cycle.

On the other hand if a workpiece $W_2$ is less than about 39½ feet in length but greater than minimum length, stop 202 of device 32 will also be operatively associated with limit switch 194 thereof. Upon plate 42 of device 28 engaging the trailing end of a workpiece $W_2$ in FIG. 2, normally open contact 188 of limit switch 184 is closed across contacts 189 of lead 168 thereby energizing leads 168 and 166 and solenoid 86 so as to cause corresponding rightward movement of the rod of actuator 25 and cart 16 until limit switch 194 is advanced into alignment with stop 202. This alignment between limit switch 194 and stop 202 opens normally closed limit switch 194 and disconnects the switch from contacts 195 of lead 204 so as to de-energize lead 204 and solenoid 210. Such de-energization of solenoid 210 advances its normally open contact 210–1 from engagement with contacts 212 of lead 168 so as to de-energize leads 168 and 166 and solenoid 86 of actuator 25. De-energization of solenoid 86 of actuator 25 precisely stops rightward advancement of cart 16 in an outward extended position with the 38' welding element thereof in welding stroke alignment position with the trailing end of a workpiece $W_2$ prior to the third and fourth welding stroke passes of the apparatus during an operative cycle thereof.

On the other hand if a workpiece $W_3$ is of a length somewhat greater than 39½ feet but slightly less than 40½ feet, stop 202 of devices 32 is operatively associated with limit switch 196 thereof. When plate 42 of device 28 engages the trailing end of a workpiece $W_3$ in FIG. 3 normally open contact 188 of limit switch 184 is closed across contacts 189 of lead 168 thereby energizing leads 168 and 166 and solenoid 86 so as to cause corresponding rightward advancement of the rod of actuator 25 and cart 16 until limit switch 196 is advanced into alignment with stop 202. At this time normally closed limit switch 196 is opened by stop 202 and disconnected from engagement with contacts 197 of lead 206 so as to de-energize lead 206 and solenoid 214. De-energization of solenoid 214 advances its normally open contact 214–1 from engagement with spaced contacts 216 of lead 168 so as to de-energize leads 168 and 166 and solenoid 86 thereby precisely stopping rightward advancement of actuator rod 25' and cart 16. Thus the cart is in an extended position with its 38' and 39' welding elements in their respective tack welding stroke alignment positions with the trailing end of a workpiece $W_3$ prior to the third and fourth welding passes of the apparatus as indicated in FIG. 3.

Upon a workpiece being greater than about 40½ feet in length such as a workpiece $\underline{W}_1$ of maximum length in FIG. 1 as sensed by sensor plate 42, stop 202 of devices 32 is operatively associated with limit switch 198 thereof. As sensor plate 42 engages the trailing end of a workpiece $\underline{W}_1$ normally open contact 182 of limit switch 184 is closed across contacts 183 of lead 168 thereby energizing leads 168 and 166 and solenoid 86 so as to effect rightward advancement of actuator rod 25" and cart 16. Rightward advancement of cart 16 continues until limit switch 198 is disposed in axial alignment with stop 202. This axial alignment advances normally closed limit switch 198 from engagement with contacts 199 of lead 208 thereby de-energizing lead 208 and solenoid 218. Normally open contact 218–1 of de-energized solenoid 218 is then disconnected from the contacts 220 of lead 168 thereby de-energizing leads 168 and 166 and solenoid 86 so as to stop rightward advancement of actuator rod 25" in cart 16. Such stopping of cart 16 disposes the plurality of three welding elements 38'–40' of cart 16 in their respective tack welding stroke alignment positions with the trailing end of a workpiece $\underline{W}_1$ wherein the 40' welding element on cart 16 is disposed inwardly of the trailing end of the workpiece in a tack welding stroke alignment position at a distance approximately equal to the tack welding stroke distance of the 40' welding element prior to the third and fourth welding passes of the apparatus as indicated in FIG. 1.

By reason of 38' welding element of cart 16 also forming the 39th weld $\underline{X}$ along the seam of a workpiece $\underline{P}_1$ when it is about or greater than 39½ feet in length and by reason of the apparatus having only an overall plurality of 40 welding elements spanning a distance of about 40 feet as aforedescribed, apparatus 10 will tend to have an enlarged spacing 222 interposed between opposed ends of adjacent 38th and 39th welds $\underline{X}$ of a workpiece $\underline{P}_1$ as depicted in FIG. 4. However, the enlarged spacing 222 does not adversely interfere with subsequent processing of the workpiece such as complete seam welding thereof.

Although not heretofore mentioned control unit 104 of circuit 94 includes a first interlock circuit 221 operatively associated with devices 32. The interlock circuit is comprised of a lead 220 connected across unit 104 and a solenoid 223 series connected to lead 220. The solenoid has a normally open contact 223–1 operatively associated with spaced bridging contacts 225 of lead 168. When unit 104 energizes lead 220 and solenoid 223 between the second and third welding strokes of an apparatus cycle, normally open solenoid contact 223–1 is advanced into bridging engagement across contacts 225 of lead 168 thereby energizing leads 168 and 166 and solenoid 86 so as to cause advancement of cart 16 from a retracted position (if a workpiece is greater than minimum length) to an outwardly extended position as aforedescribed. Thus first interlock circuit 221 prevents accidental energization of lead 168, etc. and advancement of cart 16 from a retracted position until the apparatus is between the second and third welding strokes thereof during an operative cycle. If cart 16 were extended prior to the third and fourth welding strokes of apparatus 10 such as when a workpiece is disposed in the apparatus the plurality of tack welds would be improperly formed between the ends of a workpiece thereby adversely affecting the formation of the tack welded pipe, for example, excessive distortion along the tack weld seam of the pipe workpiece itself.

Devices 32 are advantageously comprised of another set of cooperative normally closed limit switch and stop elements. These elements of devices 32 cooperate to de-energize 40' welding element or both the 39' and 40' welding elements whenever a workpiece is of a certain length less than maximum length. As indicated in FIG. 6B a normally closed limit switch 226 is connected across spaced contacts 227 of lead 232 which is connected across leads 96 and 98. A normally closed limit switch 228 is connected across spaced terminals 229 of a lead 234 which is also connected across leads 96 and 98. Master unit 104 advantageously includes a pair of preset and trigger circuits 235 and 237 for 39' and 40' tack welding elements. Unit 104 functions to energize and preset circuits 235 and 237 between the second and third welding passes of a given apparatus cycle so as to prevent accidental triggering of these circuits such as when sensing device 28 is advancing toward or away from a workpiece prior to the first welding stroke of the apparatus. As will be more fully described if circuits 235 and 237 are triggered 39' and 40' tack welding elements will be nonenergized during the fourth welding stroke; and if circuit 237 is triggered only the 40' tack welding element will be nonenergized during the fourth welding stroke.

A pair of leads 236 of circuit 235 extend between 39' tack welding element of the fourth group and control 104 and a pair of leads 238 of circuit 237 between 40' tack welding element of the fourth group and control 104, respectively. A solenoid 240 is series connected to lead 232 and has a pair of normally open contacts 240–1 and 240–2. Contact 140–1 of solenoid 240 is operatively associated with spaced contacts 242 on a lead 236 of circuit 235 and contact 240–2 of the solenoid with spaced contacts 244 on a lead 238 of circuit 237. A solenoid 246 is series connected to lead 234 and has a normally open solenoid contact 246–1 associated with spaced contacts 248 on a lead 238 of circuit 237. Since limit switches 226 and 228 are normally closed thereby energizing leads 232 and 234 and solenoids 240 and 246 respectively as shown in FIGS. 6A–6B, normally open contacts 240–1 and 240–2 of solenoid 240 and normally open contact 146–1 of solenoid 140 are depicted as closed across their associated and bridgeable contacts 242 and 244 and 248 of respective circuits 235 and 237.

As indicated in FIGS. 1–3, stop 230 of devices 32 is affixed to the outer end of bar 200 thereof which is connected to arm 38 of sensor 28. Stop 230 in being affixed to bar 200 at its outer end is spaced from stop 202 at a distance equal to the distance between adjacent welding elements such as 38' and 39' elements of cart 16. An L-shaped arm 250 is connected to the outer end of bar 192 of device 32. Limit switch 226 is affixed to the outer end of the outer leg section 252 of arm 250 in axial alignment with limit switch 196. Limit switch 228 is also affixed to outer leg section 252 but is disposed outwardly of limit switch 226 and in axial alignment with limit switch 198.

Stop 202 of devices 32 is disposed in alignment with limit switch 194 when cart 16 is in a fully retracted position or in an extended position after sensing plate 42 engages a workpiece of minimum length or greater than minimum length but less than about 39½ feet. At the same time stop 230 of devices 32 is disposed in axial alignment with limit switch 226 thereby disconnecting normally closed limit switch 226 from contacts 227 of lead 232 so as to de-energize lead 232 and solenoid 240. De-energization of solenoid 240 advances solenoid contacts 240–1 and 240–2 from connection with contacts 242 and 244 on associated leads 236 and 238 of circuits 235 and 237 so as to de-energize the leads of circuits 235 and 237 and to trigger tack welded elements 39' and 40' thereby affecting nonenergization of elements 39' and 40' during the fourth welding stroke of the apparatus when the workpiece is less than about 39½ feet.

Stop 202 is also disposed in axial alignment with limit switch 196 during advancement of cart 16 to an outwardly extended position after sensor plate 42 engages a workpiece greater than 39½ feet but less than approximately 40½ feet. At the same time stop 230 is in axial alignment with limit switch 228 as indicated in FIG. 3. Such axial alignment moves normally closed limit switch 228 from engagement with contacts 229 of leads 234 so as to de-energize lead 234 and solenoid 246. Normally open solenoid contact 146–1 upon de-energizing solenoid 246 is advanced from engagement with special contacts 248 on the associated lead 238 of circuit 237 in order to de-energize circuit 237 thereby triggering welding element 40' for nonenergization as a fourth welding stroke of apparatus 10 occurs during a given apparatus cycle thereof when a workpiece $W_3$ is greater than 39½ feet but less than about 40.5 feet. Thus limit switches and stop elements 226, 228 and 230 of devices 32 when a workpiece is of a certain length assure that the 39' welding element is non-energized or both 39' and 40' welding element are nonenergized. Such nonenergization, for example, of the 39' and 40' welding elements precludes injury to the apparatus such as accidental electrical short circuiting between the apparatus and the 39' and 40' welding elements during apparatus operation.

In still another advantageous embodiment of apparatus 10 control system 30 is comprised of another cooperative limit switch and stop devices 34. Devices 34 include an arm 254 affixed to framework 18 at the right-hand end thereof and operatively associated with bar 192 of devices 32. Devices 34 are comprised of a normally closed limit switch 256 and a stop 258 operatively associated therewith. Limit switch 256 is affixed to bar 254 adjacent the outer end thereof at a point spaced from the right-hand end of cart 16 when the right-hand end of the cart is in its outwardly most extended position as indicated by dotted lines in FIG. 1. A stop 258 of devices 34 is affixed to bar 192 of devices 32 and disposed in axial alignment with limit switch 256 of devices 34 when cart 16 is in a fully retracted position relative to first cart 14 in the manner illustrated in FIG. 1. As indicated in FIG. 6A normally closed limit switch 156 of devices 34 is connected across spaced terminals 257 of lead 164.

The control unit 104 of system 30 advantageously includes a second interlock circuit 259 operatively associated with devices 34. Circuit 259 is comprised of a lead 264 connected across unit 104 and a solenoid 262 series connected to lead 264. The solenoid has two normally open contacts 262-1 and 262-2 operatively associated with their spaced contacts 266 and 268 of respective leads 164 and 176, as depicted in FIGS. 6A-6B. The solenoid also has a normally closed contact 262-3 connected across spaced contacts 269 of lead 172. After the fourth welding stroke and prior to another operative cycle of apparatus 10 unit 104 automatically energizes lead 264 so as to energize solenoid 262.

Such energization of solenoid 262 causes bridgement of solenoid contact 262-1 across contacts 266 of lead 164 thereby energizing lead 164. Energization of lead 164 energizes lead 162 and solenoid 84 of valve 64 of actuator 25 thereby causing corresponding leftward movement of actuator rod 25'' and second cart 16. Leftward advancement of cart 16 continues until stop 258 becomes aligned with limit switch 256 thereby opening normally closed limit switch 256 and de-energizing leads 164 and 162 and solenoid 84. De-energization of solenoid 84 terminates leftward movement of actuator rod 25'' and precisely stops cart 16 in a fully retracted position after the fourth welding stroke of a given apparatus cycle and prior to another apparatus cycle as indicated in FIGS. 1-3.

Energization of solenoid 262 also closes its normally open contact 262-2 across contacts 268 of lead 176 thereby energizing leads 176 and 174 and solenoid 90 of valve 66 of actuator 46 thereby causing corresponding rightward advancement of actuator rod 48 of sensor 28 and sensor plate 42 thereof. Rightward advancement of sensor plate 42 continues until it is disposed in an out-of-the-way outermost right-hand position as aforedescribed when actuator rod 48 strikes a limit switch (not shown) which is operatively associated with lead 176 and actuator rod 48. With sensor plate 42 in an outermost right-hand position another workpiece $W$ can be fed into apparatus 10 after removing the finished workpiece such as $P$ prior to another apparatus operative cycle.

Energization of solenoid 262 after the fourth welding stroke of an apparatus cycle also advances normally closed contact 262-3 from engagement with contacts 269 of lead 172 so as to de-energize lead 172, 170 and solenoid 88 of actuator 46 thereby preventing hydraulic locking of actuator 46 since solenoid 90 of actuator 46 has been energized for rightward advancement of the rod 48 thereof, as described above. It is observed here that when second interlock circuit 259 is energized by unit 104 at the end of the fourth welding stroke of an apparatus cycle first interlock circuit 221 is also de-energized thereby de-energizing its solenoid 223. Consequently normally open contact 223-1 of de-energized solenoid 223 of first circuit 221 is advanced from engagement with contacts 225 of lead 168 in order to de-energize lead 168 and 166 and solenoid 86 of actuator 25 thereby preventing hydraulic locking of actuator 25 since solenoid 84 of actuator 25 has been energized for corresponding leftward advancement of rod 25'' and cart 16 when the second interlock circuit 259 is energized. Thus by reason of second interlock circuit 259 not being energized by unit 104 until after the fourth welding stroke of an apparatus cycle accidental leftward movement of cart 16 and accidental rightward movement of sensor plate 42 is prevented. If accidental leftward movement of cart 16 occurred during the third and fourth welding strokes of an apparatus cycle after the cart had been extended the plurality of tack welds at the trailing end of a workpiece would be improperly formed thereby adversely affecting the seam of a tack welded workpiece such as excessive separation of the seam thereof.

Devices 34 may also be comprised of a limit switch 270 having two normally open and mechanically interconnected contacts 270' and 271 as indicated in FIGS. 1-3 and 6A-6B. Limit switch 270 is affixed to bar 254 rightwardly of limit switch 256 at a distance approximately equal to the welding stroke distance of rod 24' of actuator 24 upon actuation of the actuator during operation of apparatus 10. Normally open contact 170' of switch 270 of devices 34 advantageously cooperates with stop 258 thereof as will be more fully described below for preventing formation of a 38th weld $X$ of double thickness when a workpiece is of substantially minimum length as indicated in FIG. 1. However, normally open contact 271 of limit switch 270 of devices 34 advantageously cooperates with stop 258 as also will be more fully described below for preventing the formation of weld overlap between opposed ends of adjacent 38th and 39th tack welds $X$ when a workpiece $W_2$ is greater than minimum length but less than about 39 feet, as depicted in FIGS. 2 and 5.

Normally open contact 270' of limit switch 270 is connected across spaced terminals 277 of a lead 272 which is series connected between leads 96 and 98. A solenoid 274 is series connected to lead 272. Unit 104 includes a third preset and trigger circuit 276 having two leads 278 extending between and connected to unit 104 and 38' tack welding element of fourth group 120 as shown in FIG. 6A. As with the other pair of circuits 235 and 237, circuit 238 is preset between second and third welding passes of apparatus 10. Spaced and bridgeable contacts 280 are provided on a lead 278 of circuit 276 and are bridged by normally closed solenoid contact 274-1 of solenoid 274.

When a workpiece cap $W$ is of minimum length normally closed limit switch 194 of devices 32 is opened by stop 202 thereof thereby de-energizing solenoid 210 prior to the first welding stroke of apparatus 10 as aforedescribed. Such de-energization of solenoid 210 advances normally closed contacts 210-2 across bridgeable contacts 275 of lead 272. Since cart 16 is retained in its fully retracted condition when a minimum length workpiece $W$ is disposed in apparatus 10 rightward welding stroke advancement of cart 16 during the third welding stroke of apparatus 10 causes stop 258 to strike switch 270 and close its normally open contact 270' across bridgeable contacts 277 of lead 272 thereby energizing lead 272 and solenoid 274. Such energization of solenoid 274 opens normally closed solenoid contact 274-1 across spaced terminals 280 of associated lead 278 of circuit 276 thereby triggering the circuit for nonenergization of welding element 38' upon the fourth welding stroke of the apparatus during an apparatus cycle. Thus cooperative engagement between contact 270' of switch 270 and stop 258 prevents the formation of a 38th tack weld of double thickness adjacent the trailing end of the seam $S$ of a minimum length workpiece $W$ as indicated in FIGS. 1 and 4.

Normally open contact 271 of limit switch 270 is series connectable cross bridgeable contacts 282 of a lead 284 which is series connected between leads 96 and 98. A solenoid 286 is series connected to lead 284 and has a normally closed contact 286-1 connected across spaced terminals 288 of a lead 278 of third preset trigger circuit 276 as indicated in FIGS. 6A-6B.

Control unit 104 advantageously includes a third interlock circuit 290 operatively associated with devices 34. Third circuit 290 includes a lead 292 connected across unit 104 and a selectively triggerable solenoid 294 series connected to the lead. Normally closed contact 294-1 of solenoid 294 bridges spaced terminals 296 of lead 272 and normally open contact 294-2 thereof is adapted to engage bridgeable terminals 298 of lead 284.

A fourth interlock circuit 300 of unit 104 is operatively associated with and electrically connected to solenoid 294 of third interlock circuit 290 for triggering solenoid 294 for nonenergization by lead 292 of the third circuit 290 when a workpiece is greater than about 39.0 feet. Lead 302 of fourth circuit 300 is connected across master unit 104 and series connected to solenoid 294 of third circuit 290. The fourth circuit 300 includes a solenoid 304 series connected to lead 168 of circuit 94. The solenoid has a normally open contact 304-1 adapted to bridge spaced terminals 306 of lead 302 of fourth circuit 300 when a solenoid 304 is energized. The fourth circuit 300 includes a solenoid 308 series connected to lead 204. The solenoid has a normally open contact 308-1 engageable with bridgeable contacts 310 of lead 302 of the fourth circuit 300 when solenoid 308 is energized as depicted for purposes of illustration in FIGS. 6A-6B. Solenoid 304 is energized between the second and third welding strokes of apparatus 10 upon energization of first interlock circuit 221 as aforedescribed. Solenoid 308 in being connected to lead 204 and associated with limit switch 196 of device 32 is energized and remains as such when a workpiece is greater than about 39.0 feet.

Such energization of solenoid 304 and 308 advances their normally open contacts across their associated spaced terminals 306 and 310 of their respective lead 302 of circuit 300 thereby energizing the lead thereof for triggering solenoid 294 of third circuit 290. This triggering of solenoid 294 energizes the same thereby disconnecting normally closed contacts 294-1 from engagement with the spaced terminals 296 of lead 272 and thereby advancing normally open contacts 294-2 into bridging engagement with spaced contacts 298 of lead 284. Thus the third and fourth interlock circuits 290 and 300 of unit 104 in effecting energization of solenoid 294 of third circuit 290 prevent energization of solenoid 274 that would otherwise occur when stop 258 of device 234 eventually strikes switch 270 and closes contact 270' upon a third welding stroke of carts 14 and 16 during an apparatus cycle for a workpiece greater than minimum length as indicated in FIG. 2. If solenoid 274 were energized during the third welding stroke of apparatus 10 when a workpiece is greater than minimum length, 38' welding element would be nonenergized during the fourth welding stroke thereof thereby preventing formation of a 39th tack weld. In preventing formation of a 39th tack weld, a tack welded workpiece (when it is greater than about 39.0 feet in length) may be adversely affected such as by excessive distortion of the trailing end of the seam of a workpiece as indicated in FIGS. 1-5 and 6A-6B.

Control unit 104 advantageously includes a fifth interlock circuit 312 operatively associated with devices 34 for automatically turning off an energized 38' welding element during the fourth welding stroke of apparatus 10 when workpiece $W_2$ is greater than minimum length but less than about 39.0 feet. Circuit 312 is comprised of a lead 314 connected across unit 104 and a solenoid 316 series connected to lead 314. Solenoid 316 has a normally open contact 316-1 adapted to bridge spaced contacts 318 of lead 284 when the solenoid 316 is energized. Upon unit 104 energizing lead 126 and even numbered welding elements 32'-36' of fourth group 120 in order to energize solenoid 80 of actuator 24, etc. during the fourth welding stroke of an apparatus cycle the master unit also energizes solenoid 316 of fifth circuit 312. Energization of solenoid 316 advances normally open contacts 316-1 into engagement across spaced contacts 318 of lead 284. Continued leftward advancement of carts 14 and 16 when a workpiece is greater than minimum length but less than 39.0 feet during the fourth welding stroke of an apparatus cycle eventually causes stop 258 to re-engage limit switch 270 thereby re-closing normally open contacts 270' and 271 thereof across their associated contacts 277 and 282 of their respective leads 272 and 284. Of course, closure of contact 270' across contacts 277 of lead 272 does not energize lead 272 since solenoid 294 of third interlock circuit 290 is still energized as aforedescribed. On the other hand closure of contact 271 of limit switch 270 across contacts 282 of lead 284 energizes lead 284 since both solenoids 294 and 316 of third and fifth interlock circuits 290 and 312 are respectively energized. Such energization of lead 284 energizes solenoid 286 thereby advancing normally closed contact 286-1 from engagement with contacts 288 of associated lead 278 of third trigger circuit 276 so as to de-energize the circuit 276. De-energization of circuit 276 automatically turns off an energized 38' welding element prior to the end of the fourth welding stroke of an apparatus cycle. Automatically turning off of an energized 38' welding element prevents the opposed ends of adjacent 38th and 39th tack welds $\underline{X}$ from forming an overlap or double thick weldment when the leading end of 39th weld approaches the opposed and adjacent trailing end of a previously formed 38th weld upon formation of the 39th weld by 38' welding element during the fourth welding stroke of an apparatus cycle for a workpiece greater than minimum length but less than 39.0 feet as indicated in FIGS. 2 and 5.

When a workpiece is greater than about 39.0 feet, devices 34 do not accidentally nonenergize or turn off 38' welding element during the fourth welding stroke of an apparatus cycle since limit switch 194 of devices 32 remains closed thereby energizing solenoid 210 and disconnecting its normally closed contact 210-2 from contacts 275 of lead 272. Moreover stop 258 of devices 34 would only momentarily close normally open contact 271 of limit switch 270 thereof when cart 16 is advanced from a retracted position to an extended position prior to the third welding stroke of an apparatus cycle for a workpiece length greater than 39.0 feet. Thus energization of solenoid 316 of fifth circuit 312 between the third and fourth welding strokes of an apparatus cycle would not energize solenoid 286, etc. for turning off an energized 38' welding element when the energized 38' welding element is forming the 39th tack weld on the seam of a workpiece greater than 39.0 feet during the fourth welding stroke of an apparatus cycle as normally open contact 271 of switch 270 is now geometrically off set from stop 258 as indicated in FIG. 3.

In view of the foregoing it is evident that the apparatus 10 is a highly versatile tack welder and can automatically accommodate itself to workpieces of minimum length or much greater than the minimum length. It also provides an overall plurality of tack welding elements that can be less than the required plurality of tack welds to be formed on a workpiece having a length much greater than the distance between the opposed and endmost tack welding elements of the overall plurality thereof when the second cart is fully retracted. Conversely, if desired, apparatus 10 could be adapted to effect a plurality of tack welds between the ends of a workpiece when the workpiece is of a length much less than the distance between the opposed and endmost tack welding elements of the plurality of tack welding elements thereof upon the second cart being fully retracted.

Various embodiments of the instant invention have been shown and described and thus modifications and changes can be made therein as defined by the appended claims, wherein:

What is claimed is:

1. An apparatus for tack welding the seam of a length of pipe and the like, said apparatus comprising tandemly arranged first and second interconnected carts and a framework for supporting said carts, each of said first and second carts having at least one tack welder, a first cart actuator means connected to said framework, said first cart actuator means being operable to effect tack welding stroke advancement of said first and second carts in unison with respect to and along the pipe seam, a workpiece sensing means and a sensing actuator means connected to said sensing means and said framework for advancing the sensing means from an outboard position relative to the trailing end of the pipe to an inboard and abutting position with the trailing end of the pipe, a first set of cooperative limit switch and stop means mounted on both said sensing means and said second cart for automatically indicating the tack welding stroke misalignment position of the tack welding means of said second cart with respect to the trailing end of the pipe when certain limit switch and stop means of said first set of said cooperative limit switch and stop means are in nonregistry and after the sensing means abuts the trailing end of the pipe, a second cart actuator means operatively associated with said first set of cooperative limit switch and stop means and interposed between and connected to said first and second carts, and said second cart actuator means being operable to move said second cart from a retracted position relative to said first cart to an outwardly extended position relative thereto and in a direction towards the trailing end of the pipe until certain limit switch and stop means of said first set of cooperative limit switch and stop means are in registry thereby advancing the tack welding means of said second cart from a tack welding stroke misalignment position into a tack welding stroke alignment position with the trailing end of the pipe prior to a tack welding stroke advancement of said first and second carts upon the actuation of said first cart actuator means.

2. An apparatus as set forth in claim 1 in which said second cart is provided with a plurality of tack welders.

3. An apparatus as set forth in claim 1 in which said first set of cooperative limit switch and stop means is comprised of at least one limit switch and at least one stop operatively associated therewith.

4. An apparatus as set forth in claim 2 in which said first set of cooperative limit switch and stop means includes means for de-energizing one or more tack welders of the plurality of tack welders of said second cart.

5. An apparatus as set forth in claim 1 including a control means operatively associated with and interconnected to said first and second cart actuator means, said sensing actuator means and said first set of cooperative limit switch and stop means, said control means for effecting sequential advancement of said first and second cart actuator means and said sensing actuator means in relation to the seam length of a given workpiece and for effecting formation of a plurality of spaced tack welds along the seam length of the given workpiece when said first and second cart actuator means and said sensing actuator means are sequentially advanced during an apparatus operative cycle.

6. An apparatus as set forth in claim 5 in which said control means includes an interlock circuit means for preventing actuation of said second cart actuator means so as to prevent advancement of said second cart from a fully retracted position to an outwardly extended position until the apparatus is between certain successive welding strokes during an operative cycle thereof.

7. An apparatus as set forth in claim 1 including a second set of cooperative limit switch and stop means mounted on both said framework and said second cart, certain limit switch and stop means of said second set of cooperative limit switch and stop means for effecting repositioning of said second cart from an outwardly extended position to a fully retracted position when said certain limit switch and stop means of said second set thereof are in nonregistry prior to a subsequent apparatus operative cycle.

8. An apparatus as set forth in claim 7 in which said second set of cooperative limit switch and stop means includes further alignable limit switch and stop means for effecting selective nonenergization of a tack welder of said second cart prior to or upon a certain tack welding stroke of the apparatus when a workpiece is of a certain length during an apparatus operative cycle.

9. An apparatus as set forth in claim 5 including a second set of cooperative limit switch and stop means mounted on both said framework and said second cart and operatively associated with said control means, certain limit switch and stop means of said second set thereof for effecting repositioning of said second cart from an extended position to a fully retracted position and for effecting repositioning of said sensing means from an inboard and workpiece abutting position to an outboard and workpiece nonengaging position prior to a subsequent apparatus operative cycle and said control means including a second interlock circuit for automatically preventing operation of said certain limit switch and stop means of said second set thereof until after a certain welding stroke of said apparatus.

10. An apparatus as set forth in claim 9 in which said second set of cooperative limit switch and stop means includes further alignable limit switch and stop means for effecting nonenergization of a tack welder of said second cart so as to prevent formation of a double-thick weldment when a workpiece is of approximately minimum length as well as for effecting selective nonenergization of an energized tack welder of said second cart so as to prevent formation of weld overlapment between opposed ends of adjacent welds when a workpiece is of a length greater than minimum length and said control means operatively connected to said further alignable limit switch and stop means of said second cart for preventing operation of said further alignable limit switch and stop means of said second set thereof until a certain welding stroke during an apparatus operative cycle.

11. An apparatus as set forth in claim 10 in which said control means includes cooperable third and fourth interlock circuit means for preventing operation of said further alignable limit switch and stop means of said second set thereof when a workpiece is of approximately minimum length until a certain welding stroke during an apparatus operative cycle.

12. An apparatus as set forth in claim 11 in which said control means includes a fifth interlock circuit means operatively associated with said third and fourth interlock circuit means for preventing operation of said further alignable limit switch means of said second set thereof when a workpiece is somewhat greater than minimum length until a certain welding stroke during an apparatus operative cycle.

* * * * *

UNITED STATES PATENT OFFICE
CERTIFICATE OF CORRECTION

Patent No. 3,654,419    Dated April 4, 1972

Inventor(s) Hugo H. Ovando

It is certified that error appears in the above-identified patent and that said Letters Patent are hereby corrected as shown below:

In the Title, "Track" should be -- Tack --;

Column 3, line 60, "rod 25'" should be -- rod 25" --;

Column 7, line 2, "2'-30< 1/8 and 38'" should be -- 2'-30' and 38' --

Column 7, line 6, "welding element as shown" should be -- welding elements as shown --;

Column 8, line 27, "rod 14'" should be -- rod 24' --;

Column 10, line 35, "device 32" should be -- devices 32 --;

Column 12, line 19, "Contact 140-1" should be -- Contact 240-1 -

Column 12, line 31, "140 are" should be -- 240 are --;

Column 12, line 71, "contact 146-1" should be -- contact 246-1 -

Column 14, line 30, "contact 170'" should be -- contact 270' --; and

Column 15, line 39, "solenoid 304" should be -- solenoids 304 --

Signed and sealed this 5th day of September 1972.

(SEAL)
Attest:

EDWARD M. FLETCHER. JR.
Attesting Officer

ROBERT GOTTSCHALK
Commissioner of Patents